(12) United States Patent
Zbiral

(10) Patent No.: US 12,283,711 B2
(45) Date of Patent: Apr. 22, 2025

(54) VENTING UNIT AND HOUSING, IN PARTICULAR A BATTERY HOUSING

(71) Applicant: MANN+HUMMEL GmbH, Ludwigsburg (DE)

(72) Inventor: Robert Zbiral, Marbach (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 534 days.

(21) Appl. No.: 17/857,708

(22) Filed: Jul. 5, 2022

(65) Prior Publication Data
US 2023/0012294 A1    Jan. 12, 2023

(30) Foreign Application Priority Data

Jul. 8, 2021 (DE) ..................... 10 2021 117 692.1

(51) Int. Cl.
*H01M 50/342* (2021.01)
*H01M 50/204* (2021.01)

(52) U.S. Cl.
CPC ..... *H01M 50/3425* (2021.01); *H01M 50/204* (2021.01)

(58) Field of Classification Search
None
See application file for complete search history.

(56) References Cited

U.S. PATENT DOCUMENTS

| | | | |
|---|---|---|---|
| 2005/0138930 A1 | 6/2005 | Foster-Pegg | |
| 2005/0205129 A1 | 9/2005 | Karalis et al. | |
| 2010/0294762 A1 | 11/2010 | Kolon et al. | |
| 2014/0332085 A1* | 11/2014 | Grace | H01M 10/625 429/82 |
| 2024/0136648 A1* | 4/2024 | Scholpp | F16K 17/00 |

FOREIGN PATENT DOCUMENTS

| | | |
|---|---|---|
| DE | 102012022346 B4 | 3/2018 |
| DE | 202019106891 U1 | 12/2020 |

* cited by examiner

*Primary Examiner* — Wyatt P McConnell

(57) ABSTRACT

A venting unit for a housing has a base body to be connected fluid-tightly to a rim of a housing opening. The base body has a gas passage opening closed by a membrane that spans areally across the gas passage opening transversely to an axial direction. An actor is operatively connected to the base body and has an emergency venting spike extending axially toward the membrane. The emergency venting spike has a tip or a cutting edge arranged, in a state of rest, at a predetermined distance from a membrane surface of the membrane and can move toward the membrane when the actor is actuated so that tip or cutting edge punctures the membrane. A cover arranged at an outer side of the base body covers the gas passage opening. A fastening mechanism connects cover and base body. The actor has an actuation element for releasing the fastening mechanism.

21 Claims, 12 Drawing Sheets

VENTING UNIT AND HOUSING, IN PARTICULAR A BATTERY HOUSING

TECHNICAL FIELD

The invention concerns a venting unit and an electronics housing, for example a battery housing, in particular of a rechargeable traction battery of an electrically driven motor vehicle.

BACKGROUND OF THE INVENTION

Housings for receiving electronic components such as, for example, battery cells and the like, cannot be closed off completely gas-tightly in relation to the environment because, on the one hand, due to temperature fluctuations, for example, by heat inputs during charging or discharging of battery cells, and, on the other hand, due to naturally occurring air pressure fluctuations, in particular in mobile systems, a gas exchange between interior and exterior must be enabled in order to prevent impermissible mechanical loads on the housing, in particular bursting or bulging of the housing.

It is likewise important however that the ingress of foreign bodies, dirt, and moisture in the form of liquid water is effectively prevented. Therefore, pressure compensation devices are known which comprise semipermeable membranes, for example, of extruded polytetrafluoroethylene (PTFE) that are gas-permeable but liquid-impermeable.

DE 102012022346 B4 discloses a battery housing that comprises a housing, enclosing a housing interior, with a housing opening that is covered by means of a membrane carrier in the form of a housing cover, provided for venting and for substantially water-tight sealing of the housing interior against ingress of water, preferably also other liquids, which comprises a carrier body that comprises a gas passage opening for discharging gases or for pressure compensation which extends continuously between a carrier body inner side and a carrier body outer side. The gas passage opening is completely covered by a semipermeable membrane. The carrier body, the membrane, and the housing are air-tightly or gas-tightly connected such that substantially no water and no particles can pass through the housing opening into the housing interior.

SUMMARY OF THE INVENTION

An object of the invention is to create a venting unit for a housing, in particular of a battery, in particular of a traction battery of a motor vehicle, which enables a quick pressure release upon occurrence of an excess pressure in the housing.

A further object is to create a housing, in particular a battery housing, in particular of a traction battery of a motor vehicle, which permits a quick pressure release upon occurrence of an excess pressure in the housing.

A further object is to provide a method for venting a housing, in particular of a battery, in particular of a traction battery of a motor vehicle, with a venting unit which permits a quick pressure release upon occurrence of an excess pressure in the housing.

The aforementioned object is solved according to an aspect of the invention by a venting unit for a housing, in particular of a battery, in particular of a traction battery of a motor vehicle, with a base body that is fluid-tightly connectable to a rim of a housing opening of the housing, with an outer side and an inner side, and which comprises at least one gas passage opening which is closed by a membrane that spans areally across transversely to an axial direction, wherein the base body is operatively connected to an actor which comprises an emergency venting spike which extends in axial direction toward the membrane and whose tip or at least one cutting edge in a state of rest is arranged spaced apart at a predetermined distance from a membrane surface, wherein the base body or the housing comprises the actor.

The further object is solved according to a further aspect of the invention by a housing, in particular battery housing, in particular of a traction battery of a motor vehicle, for receiving battery cells, which comprises at least one housing wall with a housing opening, wherein the housing opening is closed by a venting unit.

The further object is solved according to a further aspect of the invention by a method for venting a housing, in particular of a battery, in particular of a traction battery of a motor vehicle, with a venting unit, wherein an actor is actuated by a control signal of the battery and/or of the vehicle and punctures with an emergency venting spike a membrane which closes a gas passage opening so that a gas discharge from the housing is realized through the gas passage opening.

Beneficial embodiments and advantages of the invention result from the additional claims, the description, and the drawing.

According to an aspect of the invention, a venting unit for a housing, in particular of a battery, in particular of a traction battery of a motor vehicle, is proposed, with a base body that is fluid-tightly connectable to a rim of a housing opening of the housing, with an outer side and an inner side, and which comprises at least one gas passage opening which is closed by a membrane that spans areally across transversely to an axial direction, wherein the base body is operatively connected to an actor which comprises an emergency venting spike which extends in axial direction toward the membrane and whose tip or at least one cutting edge in a state of rest is arranged spaced apart at a predetermined distance from a membrane surface. In this context, the base body or the housing comprises the actor.

The venting unit is in particular provided as a pressure compensation device with integrated emergency opening for a housing of a high-voltage battery through which gaseous fluids can flow upon pressure compensation and in particular in case of a collapsing battery cell, the so-called thermal runaway. In the state of rest of the actor, the emergency venting spike is arranged at a predetermined distance in relation to the membrane surface. Upon activation of the actor, the actuation element of the actor is moved with the emergency venting spike toward the membrane so that the tip or the at least one cutting edge of the emergency venting spike can puncture or cut through the membrane. Due to its tip or its at least one cutting edge, the emergency venting spike produces a targeted weakening or local cut in the membrane so that the latter ruptures. This serves for ensuring an emergency venting function reacting as quickly as possible and in an anticipatory manner by active control action, which is important in order to be able to ensure in case of a sudden inner pressure increase in the electronics housing that the housing structure remains intact. Due to a targeted and anticipatory active control action of the actor, the opening cross section for the emergency venting action can already be released before the actual pressure increase occurs so that the latter can then be released especially quickly and in a defined manner.

The membrane is actively caused to rupture, i.e., by action of the emergency venting spike of the actor on the membrane, independent of the pressure loading. The actuation of the actor can be realized in this context pneumatically, hydraulically, mechanically, for example, by a spring, electrically, magnetically or by a combination of two or more of the aforementioned action principles. For example, a linear magnet or a lifting magnet can be used. Alternatively, for example, also an actor with a spring-loaded needle can be used whose fixation is released by a linear magnet or lifting magnet. Optionally, an actor can also be designed as an actuator. Such actuators are disclosed, for example: www.ags-stellantriebe.de/de/stellantriebe/hubantriebe-und-linearantriebe.

Bursting of the membrane is realized in this manner independent of the material properties and the geometry, the temperature, and the pressure difference at the membrane. Bursting of the membrane can be initiated in a targeted fashion and with great precision, independent of the geometry of the membrane, based on pressure values and/or temperature values that are being measured or by means of characteristic fields which result from a number of data of different sensors and enable to draw conclusions in regard to the operating state. Opening of the gas passage opening by bursting of the membrane is realized directly and independently of the material properties of the membrane that are temperature-dependent.

As materials for the base member and/or the cover, in particular plastic materials are conceivable, preferably thermoplastic plastic materials that can be processed by injection molding. Preferably, the base body and/or the cover is comprised of polypropylene, polybutylene terephthalate or polyamide, each optionally comprising reinforcement fibers, in particular glass fibers, or comprises at least one of these materials.

At the outer side of the base body, a cover is arranged which covers the gas passage opening and which is connected to the base body. The cover is connected by a fastening mechanism, in particular a locking mechanism, to the base body. In this context, the actor comprises an actuation element which is configured for releasing the fastening mechanism.

Advantageously, the actor can release with the actuation element the fastening mechanism that can be beneficially embodied as a locking mechanism for simple mounting of the cover. The cover can thus move away from its normal position, for example, due to the pressure of the inflowing gas or pushed by the actuation element. Accordingly, the fluid path for the outflowing gas, which extends through the gas passage opening, can be enlarged beneficially in cross section. Particularly advantageously, the cover can be lifted off by the actor, in particular by the actuation element, and completely removed from its normal position in the state of rest.

According to a beneficial embodiment of the venting unit, the cover can comprise an actuation sleeve which is configured for interaction with the actuation element of the actor for releasing the fastening mechanism of the cover, wherein the actuation element in a state of rest is arranged spaced apart at a predetermined distance from a bottom of the actuation sleeve. Upon actuation of the actor, the actuation element can be brought into contact with the actuation sleeve of the cover and, upon further actuation of the actor, the cover can be lifted by the actuation sleeve. In this way, the fastening mechanism of the cover can be released. The cover can even be completely lifted off and removed thereby. Accordingly, the passage opening of the venting unit is substantially freed.

According to a beneficial embodiment of the venting unit, the actor can be arranged at the inner side of the base body or at an outer side of the housing. Alternatively, the actor can be arranged also at an inner side of the housing. The actor can be arranged advantageously at the base body and thus can be connected thereto. Alternatively, the actor can however also be arranged outside of the housing at the outer side. In this manner, the actor must not be directly connected to the venting unit.

According to a beneficial embodiment of the venting unit, the emergency venting spike can be arranged at an actuation surface of the actuation element which is facing the membrane. In this arrangement, the membrane can be beneficially punctured with the emergency venting spike and thus caused to burst.

According to a beneficial embodiment of the venting unit, the bottom of the actuation sleeve can comprise a receiving region for the emergency venting spike so that the actuation surface of the actuation element in case of actuation rests flat against the bottom of the actuation sleeve and the tip or the at least one cutting edge of the emergency venting spike is received in the receiving region. In case of such an embodiment, the actuation surface of the actuation element can contact directly the actuation sleeve of the cover and exert the corresponding pressure in order to release the fastening mechanism of the cover.

According to a beneficial embodiment of the venting unit, the actor can be embodied as an electrically actuatable actor, in particular as an electromagnetic actor. The actor can be advantageously embodied with a linear magnet or a lifting magnet. In this way, a reliable and quick actuation of the actor can be ensured. Also, the actuator can thus be controlled beneficially with electrical control signals.

According to a beneficial embodiment of the venting unit, the actor can be configured for direct actuation of the actuation element. Alternatively, the actor can be configured for indirect actuation of the actuation element, in particular by means of release of a pretensioning mechanism. The actuation of the actor can be realized in a direct manner pneumatically, hydraulically, mechanically, for example, by a spring, electrically, magnetically or by a combination of the aforementioned action principles. For example, a linear magnet or a lifting magnet can be used. In case of indirect actuation, for example, an actor with a spring-loaded needle can be used also whose fixation is released by a linear magnet or lifting magnet.

According to a beneficial embodiment of the venting unit, the actor can comprise at least one signal input for a control signal of the battery and/or of the vehicle. The actor can be activated in this manner when, for example, the battery control unit signals an imminent increasing pressure due to a cell that is becoming defective. Alternatively, the actor can also be activated, for example, by means of a crash signal in case of an accident of the vehicle.

According to a beneficial embodiment of the venting unit, the membrane can be arranged at an inner side of the base body. A contact or connection of the membrane at the inner side of the base body has the advantage that the membrane for inner pressure action is held essentially with form fit against the base body, and the connection (welding, gluing or the like) is not loaded with tension, which can be particularly important when using PTFE materials that are difficult to join anyway. In order to prevent even for pressure action, for example, of an inner pressure or, for example, an outer pressure by e.g. water, an impermissibly strong bending or "bulging" of the membrane, which can lead to its destruction, the base body can comprise additionally an outer membrane protection grid which spans across the membrane surface externally at least partially but is provided with a sufficiently large fluid-permeable surface proportion in order to enable the gas exchange in normal operation and to not impermissibly impair the fluid flow upon emergency venting.

According to a beneficial configuration of the venting unit, the membrane can be configured as a gas-impermeable membrane, in particular as a polymer film. Advantageously, a membrane that is not gas-permeable, for example, a polymer film, can be used in order to ensure the seal-tightness of the housing in intended operation.

According to a beneficial embodiment of the venting unit, the membrane can be designed as a semipermeable membrane which enables passage of gaseous media from an environment into the housing and vice versa and prevents passage of liquid media and/or solids.

For the semipermeable membrane, all materials can be used that comprise a gas permeability for bidirectional venting in normal operation and a sufficiently high water impermeability. As a preferred material for the semipermeable membrane, polytetrafluoroethylene (PTFE) can be used. The semipermeable membrane comprises an average pore size that can be between 0.01 micrometer and 20 micrometers. The porosity lies preferably at approximately 50%; the average pore size amounts to preferably approximately 10 micrometers.

The semipermeable membrane can be preferably designed as a film-type or film-shaped or disk-shaped thin membrane. The gas-permeable membrane comprises a membrane surface which is effective for the gas permeation which, at its outer circumference, preferably has a rectangular or round outer contour. It is however understood that the outer circumference of the membrane can also be designed differently. The membrane is preferably a thin flat membrane whose membrane surfaces, effective for the gas passage and facing away from each other, are substantially parallel to each other and preferably are substantially configured to be planar.

The membrane thickness of the membrane is very much smaller than its other outer dimensions. The membrane can span across a minimum width and/or a minimum length or a minimum outer diameter of equal to or larger than 20 mm, preferably of equal to or larger than 30 mm, in particular of equal to or larger than 40 mm. The membrane thickness can be in particular at least 10 times, in particular 20 times, preferably at least 40 times, in particular at least 100 times, smaller than the minimum width and/or the minimum length or the minimum outer diameter of the membrane. The membrane thickness can amount to 1 micrometer to 5 millimeters, wherein a membrane thickness of 0.1 to 2 mm, in particular 0.15 to 0.5 mm is preferred.

Moreover, the membrane can be circumferentially connected, in particular welded, to a rim of the gas passage opening of the base body, preferably at an inner side of the base body. Alternatively, the membrane can also be glued. The porous PTFE membrane materials which are herein described as preferred can be welded without problem or connected in other ways by material fusion to a plastic base body.

According to a beneficial embodiment of the venting unit, the base body can comprise at least one fastener engagement region that is configured for fastening the venting unit at the housing.

Advantageously, the fastener engagement region of the base body can comprise a bore, in particular a blind bore, that is open toward the inner side and/or outer side of the base body. A corresponding fastener can be brought into engagement with this bore, in particular from a housing interior or housing exterior of the electronics housing.

According to a beneficial embodiment of the venting unit, the venting unit can comprise a housing seal which circumferentially surrounds the gas passage opening of the base body at the inner side.

The housing seal can be configured as an axial or radial seal, i.e., in particular present at an end face (in case of the axial seal) or at a wall surface (in case of the radial seal). The housing seal can be embodied as an O-ring, which is received in a corresponding groove of the base body, or as a molded-on seal component. An arrangement of the housing seal in axial configuration is preferred, wherein particularly preferred the housing seal surrounds a bayonet connection means which in particular projects in the axial direction. The housing seal can be configured in particular also as a shaped seal with a non-circular cross section, in particular stretched in length direction.

According to a further aspect of the invention, a housing, in particular a battery housing, in particular of a traction battery of a motor vehicle, is proposed for receiving battery cells, which comprises at least one housing wall with a housing opening, wherein the housing opening is closed by a venting unit, wherein the venting unit is embodied according to the invention.

In this context, mounting of the venting unit is in particular provided such that the latter is connected by means of at least one fastener, in particular a screw, to a wall of the housing, wherein the fastener is in engagement with the fastener engagement region of the base body. Due to the screw connection, the seal pretensioning forces required for compression of the housing seal are produced. The screw connection can be in particular realized from an interior of the electronics housing. Of course, embodiments of the invention in which the screw connection of the venting unit to the housing is realized from the exterior are also encompassed.

Finally, the housing wall can comprise at an outer side a seal surface circumferentially surrounding the housing opening at which the housing seal of the venting unit is resting in a mounted state. The seal surface is preferably embodied as a region of the wall of the housing with deviations as little as possible with regard to flatness and minimal roughness. Beneficially, the housing or at least its wall comprises a metal material or consists thereof so that the seal surface, with regard to the aforementioned properties, can be obtained simply by mechanical processing.

According to a further aspect of the invention, a method for venting a housing, in particular of a battery, in particular of a traction battery of a motor vehicle, with a venting unit is proposed, wherein an actor is actuated by a control signal of the battery and/or of the vehicle and, by means of an emergency venting spike, punctures a membrane, which closes a gas passage opening, so that a gas discharge from the housing is realized through the gas passage opening.

The actor can be activated by a control signal when, for example, the battery control unit signals an imminent increasing pressure due to a cell becoming defective. Alternatively, the actor can also be activated, for example, by means of a crash signal in case of an accident of the vehicle. Upon activation of the actor, the actuation element of the actor is moved with the emergency venting spike toward the membrane so that the tip or the at least one cutting edge of the emergency venting spike can puncture or cut through the membrane. Due to its tip or its at least one cutting edge, the emergency venting spike creates a targeted weakening of the membrane so that the latter ruptures. This serves for ensuring an emergency venting function reacting as quickly as possible and in particular in an anticipatory manner, which is important in order to be able to ensure in case of a sudden inner pressure increase in the electronics housing that the housing structure remains intact. Advantageously, the membrane is caused to rupture actively, i.e., by action of the emergency venting spike of the actor on the membrane, independent of pressure loading. According to a beneficial configuration of the method, the actor, after puncturing the membrane with the emergency venting spike, can release a fastening mechanism, in particular a locking mechanism, of a cover which is arranged at an outer side.

Advantageously, the actor can release with the actuation element the fastening mechanism that is beneficially embodied as a locking mechanism for simple mounting of the cover element. The cover can thus move away from its normal position, for example, by the pressure of the flowing gas or by the actuation element. In this way, the fluid path for the outflowing gas, which extends through the gas passage opening, can be beneficially enlarged in cross section. Particularly advantageously, the cover can be lifted off by the actor, in particular by the actuation element, and can be removed completely from its normal position in the state of rest.

BRIEF DESCRIPTION OF THE DRAWINGS

Further advantages result from the following drawing description. In the drawings, embodiments of the invention are illustrated. The drawings, the description, and the claims contain numerous features in combination. A person of skill in the art will consider the features expediently also individually and combine them to expedient further combinations.

DESCRIPTION OF PREFERRED EMBODIMENTS

Figure 1:
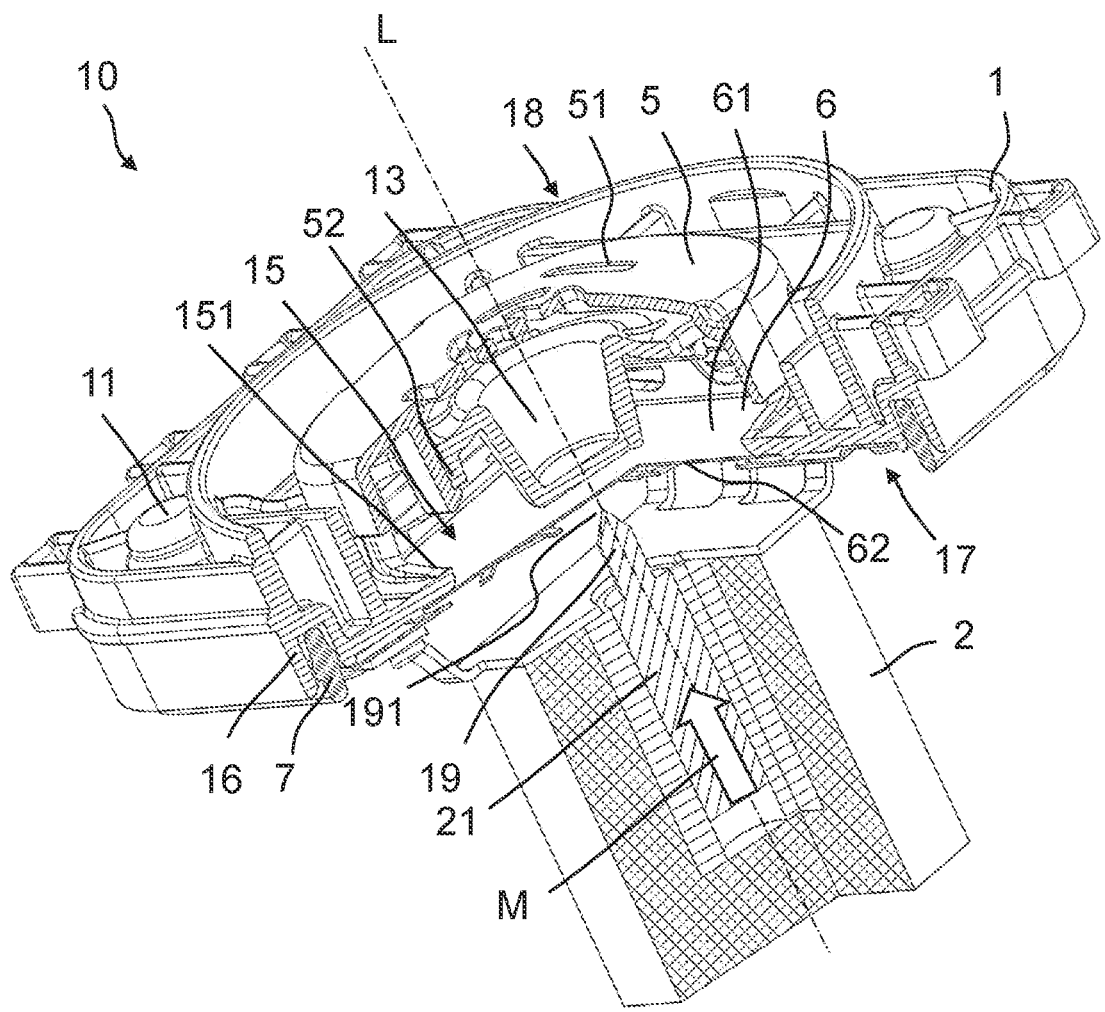
FIG. 1 shows an isometric section view of a venting unit according to an embodiment of the invention.

In the Figures, same or same type components are identified with same reference characters. The Figures show only examples and are not to be understood as limiting.

Figure 2:
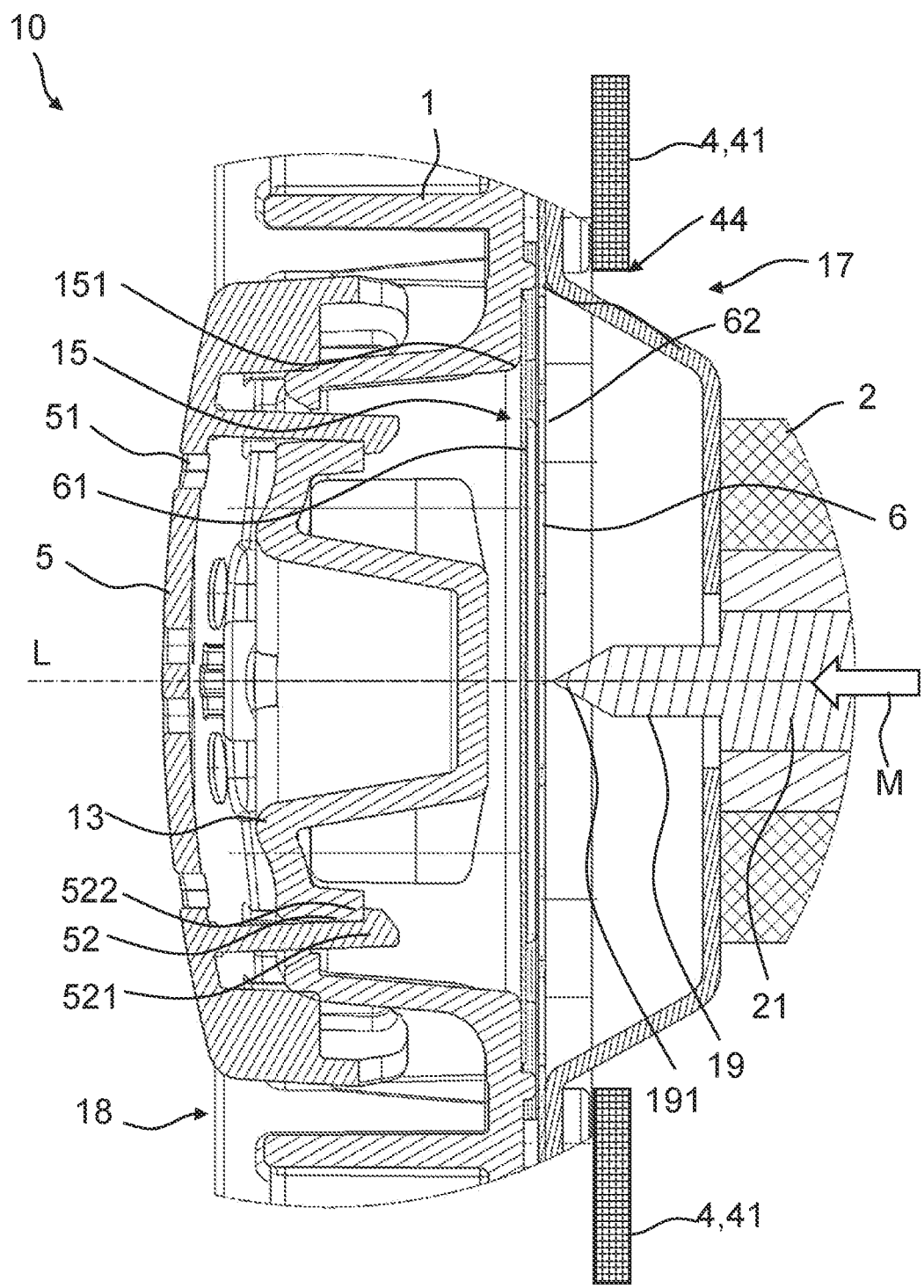
FIG. 2 shows a longitudinal section of the venting unit according to FIG. 1.

FIG. 1 shows an isometric section view of a venting unit 10 for a housing 4, in particular of a battery, in particular of a traction battery of a motor vehicle, according to an embodiment of the invention, while in FIG. 2 a longitudinal section of the venting unit according to FIG. 1 is illustrated.

The venting unit 10 comprises a base body 1 which can be connected fluid-tightly to a rim of a housing opening 44 of the housing 4, with an outer side 18 and an inner side 17. The base body 1 comprises at least one gas passage opening 15 which is closed by a membrane 6 spanning across areally transversely to an axial direction L. The gas passage opening 15 comprises a rim 151 that circumferentially delimits the gas passage opening 15. The base body 1 is operatively connected to an actor 2 which comprises an emergency venting spike 19 which extends in axial direction L toward the membrane 6. Its tip 191 is configured as a tip of a cylinder-shaped actuation element 21 and is arranged in a state of rest spaced apart at a predetermined distance from a membrane surface 61, 62. In the embodiment illustrated in FIGS. 1 and 2, the actor 2 is arranged at the base body 1 and connected thereto.

At the outer side 18 of the base body 1, a cover 5 is arranged which covers the gas passage opening 15 and which is connected to the base body 1. The cover 5 is connected by a fastening mechanism, which here is embodied as a locking mechanism 52, to the base body 1. The locking mechanism 52 comprises a locking element 521 in the form of a snap hook arranged at the cover 5. The counter locking element 522 which locks with the locking element 521 is arranged at the base body 1. The cover 5 comprises bidirectional venting openings 51 that allow air to pass to/from the membrane 6 respectively the gas passage opening 15.

In this illustrated example, the actor 2 is arranged at the inner side 17 of the base body 1. Alternatively, the actor 2 can however also be arranged at the outer side of the housing 4.

The actor 2 can be, for example, embodied as an electrically actuatable actor, in particular as an electromagnetic actor with a linear magnet or a lifting magnet. In this context, the actuation element 21 can be designed, for example, as a linearly movable armature of a lifting magnet system.

In an alternative embodiment, the actor 2 can also be embodied as an actuator.

In this manner, the actor 2 can be embodied for direct actuation of the actuation element 21. Alternatively, it is however also possible that the actor 2 is configured for indirect actuation of the actuation element 21, for example, by release of a pretensioning mechanism. The actuation element 21 can be pretensioned, for example, by a spring; the fixation is released by the actor 2.

For its activation, the actor 2 can comprise, for example, at least one signal input for a control signal of the battery and/or of the vehicle.

The membrane 6 is arranged at an inner side 17 of the base body 1 and can be configured, for example, as a gas-impermeable membrane, in particular as a polymer film. The membrane 6 comprises an outer membrane surface 62 oriented toward the outer side 18 of the base body 1 and an inner membrane surface 61 oriented toward the inner side 17.

When, however, by means of the venting unit 10 a pressure compensation is to be realized between the interior of the housing and the environment for normal operation by air pressure fluctuations or temperature fluctuations, it is advantageous when the membrane 6 is configured as a semipermeable membrane which enables passage of gaseous media from an environment into the housing 4 and vice versa and prevents passage of liquid media and/or solids.

The base body 1 comprises at least one fastener engagement region 11 that is configured for an attachment of the venting unit 10 at the housing 4. The venting unit 10 comprises moreover a housing seal 7 which circumferentially surrounds the gas passage opening 15 of the base body 1 at the inner side 17 and with which the venting unit 10 can be seal-tightly arranged upon mounting at the housing 4. The seal 7 is received in a seal receiving groove 16 of the base body 1.

The base body 1 comprises an actuation sleeve 13 which is interacting with the actuation element 21 of the actor 2. The actuation sleeve 13 is fixedly coupled to the base body 1, in particular the actuation sleeve 13 is an integral part of the base body 1. In a state of rest, the actuation element 21 is arranged spaced apart at a predetermined distance from a bottom of the actuation sleeve 13. If the actor 2 is activated the actuation element 21 is axially displaced towards the bottom of the actuation sleeve 13 and will compress the membrane 6 with its emergency venting spike tip 191 until it ruptures. In other words, the bottom of the actuation sleeve 13 provides a defined counter surface for effecting the rupture of the membrane 6 at a controlled membrane stroke.

The housing 4 comprises a housing wall 41 with a housing opening 44, as schematically indicated in longitudinal section in FIG. 2. The housing opening 44 is seal-tightly closed by the venting unit 10 in intended operation.

According to the method according to the invention for venting the housing 4, in case that a high inner pressure in the housing 4 is to be discharged to the exterior, the actor 2 is actuated by a control signal of the battery and/or of the vehicle. The actor 2 is activated and moves in axial direction L toward the membrane 6. The movement direction of the actor 2 is indicated by an arrow M. The emergency venting spike 19 of the actor 2 punctures the membrane 6, which closes the gas passage opening 15, so that a gas discharge from the housing 4 can be realized through the gas passage opening 15.

Figure 3:
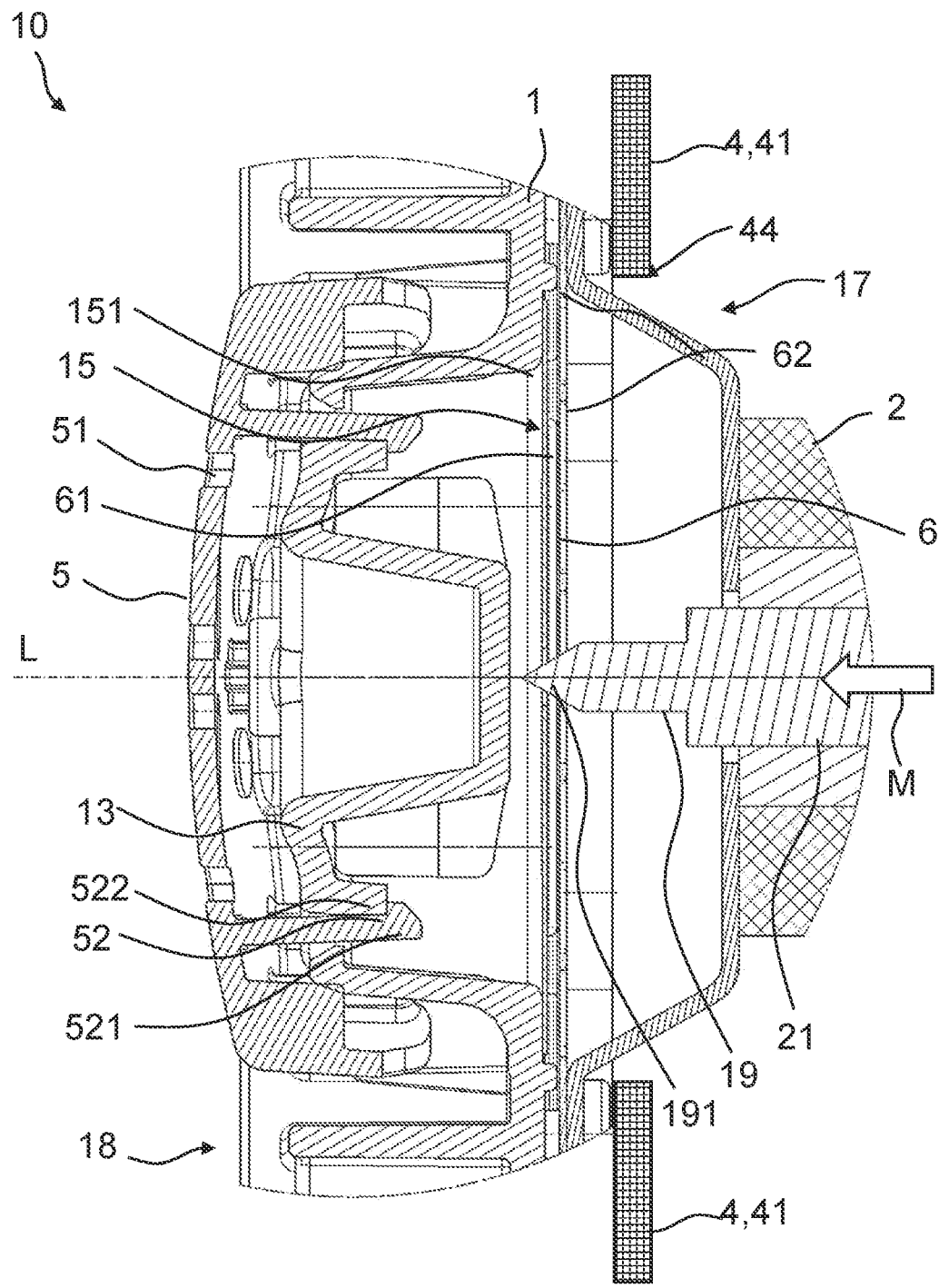
FIG. 3 shows a longitudinal section of the venting unit according to FIG. 1 with activated actor and punctured membrane.

FIG. 3 shows a longitudinal section of the venting unit 10 according to FIG. 1 with activated actor 2 and punctured membrane 6. In this context, the tip 191 of the emergency venting spike 19 has punctured the membrane 6. With correspondingly high inner pressure in the housing 4 and a beneficial membrane property, the membrane 6 can burst due to the puncturing and release the gas passage opening 15 very quickly and almost across the entire cross section.

Figure 4:
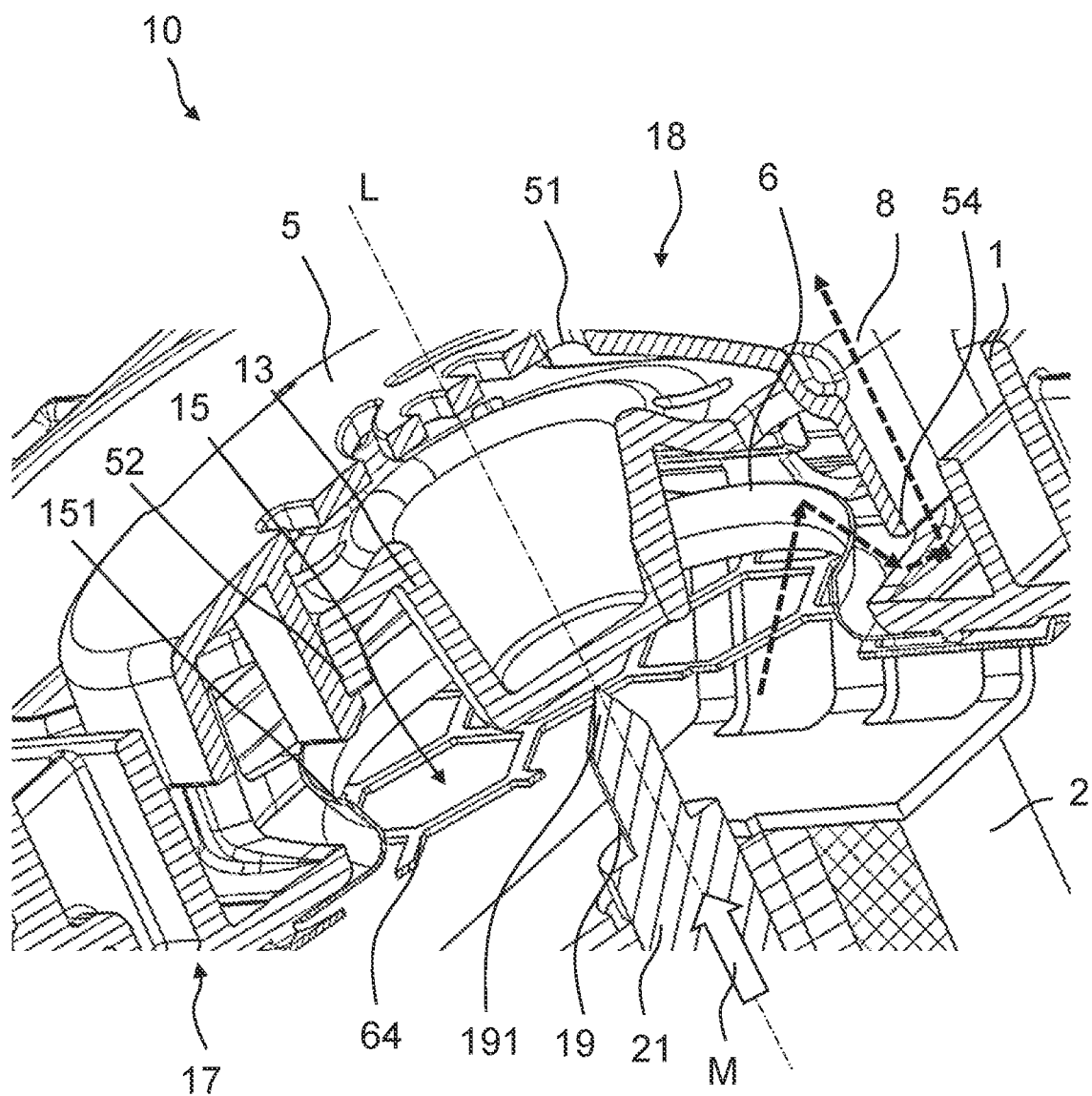
FIG. 4 shows an isometric section view of the venting unit according to FIG. 1 with activated actor.

In FIG. 4, an isometric section view of the venting unit 10 with burst-open membrane 6, illustrated bent upward at the rims toward the outer side 18, can be seen. With released gas passage opening 15, the membrane protection grid 64 can be seen which supports the inner membrane surface 61 against the pressure from the outer side 18. The fluid path 8 that the outflowing gas follows is also indicated. The gas flows through the gas passage opening 15, is then however deflected by the cover 5. The gas flows about its lower rim 54 before it can flow out to the outer side 18.

Figure 5:
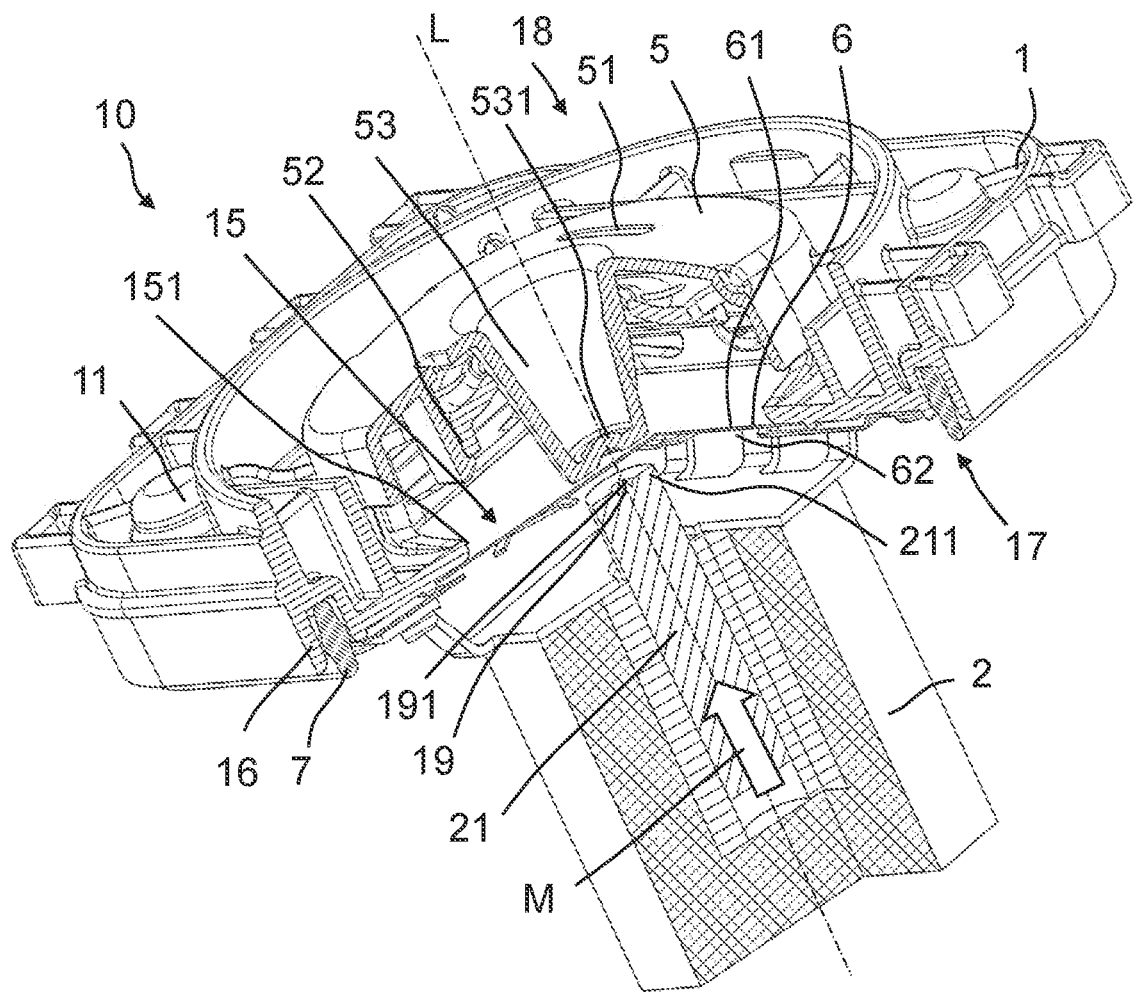
FIG. 5 shows an isometric section view of a venting unit according to a further embodiment of the invention.
Figure 6:
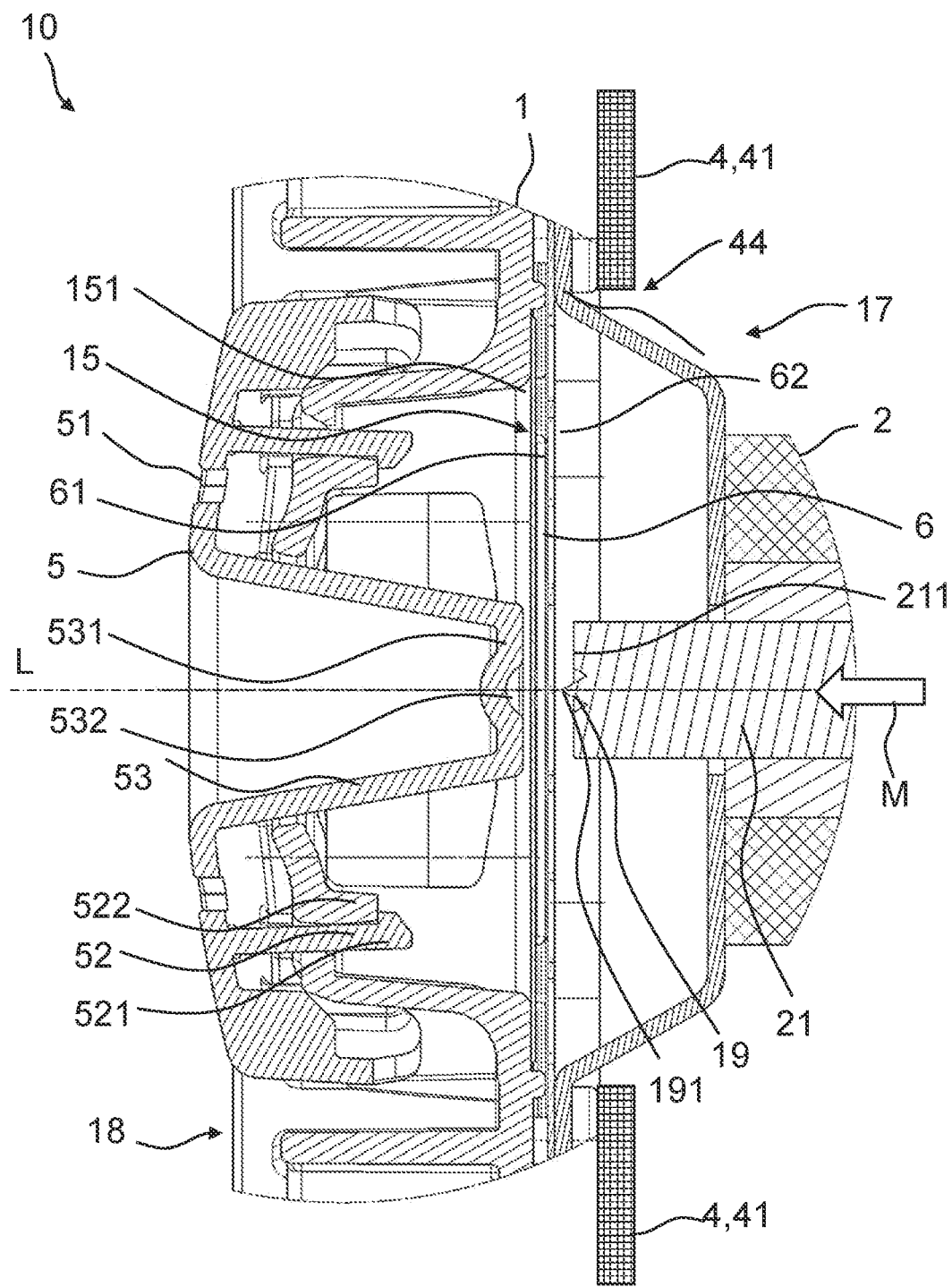
FIG. 6 shows a longitudinal section of the venting unit according to FIG. 5.

FIG. 5 shows an isometric section view of a venting unit 10 according to a further embodiment of the invention while in FIG. 6 a longitudinal section of the venting unit 10 according to FIG. 5 in the state of rest of the actor 2 is illustrated.

The configuration of the venting unit resembles very much the embodiment illustrated in FIGS. 1 through 4. The actor 2 comprises also a cylinder-shaped actuation element 21 which however in this example is configured for releasing the fastening mechanism, which is illustrated as locking mechanism 52, and for lifting the cover 5 and for puncturing the membrane.

The cover 5 comprises an actuation sleeve 53 which is interacting with the actuation element 21 of the actor 2 when releasing the fastening mechanism of the cover 5. In a state of rest, the actuation element 21 is also arranged spaced apart at a predetermined distance from a bottom 531 of the actuation sleeve 53.

In this embodiment, the emergency venting spike 19 is arranged at an actuation surface 211 of the actuation element 21 which is facing the membrane 6. The emergency venting spike 19 with tip 191 is of a smaller configuration and is partially recessed into the end face of the actuation element 21 embodied as an actuation surface 211.

The bottom 531 of the actuation sleeve 53 comprises a receiving region 532 for the emergency venting spike 19 so that the actuation surface 211 of the actuation element 21 in the actuation situation rests flat against the bottom 531 of the actuation sleeve 53 and the tip 191 of the emergency venting spike 19 is received in the receiving region 532. The bottom 531 of the actuation sleeve 53 comprises in this context a recess as a receiving region 532 for the tip 191.

According to the method according to the invention, for venting the housing 4 in the case that a high inner pressure in the housing 4 is to be discharged to the exterior, the actor 2 is actuated by a control signal of the battery and/or of the vehicle. The actor 2 is activated and moves in axial direction L toward the membrane 6. The movement direction of the actor 2 is illustrated by an arrow M. The emergency venting spike 19 of the actor 2 punctures the membrane 6, which closes the gas passage opening 15, and can then rest with the actuation surface 211 against the flat bottom 531 of the actuation sleeve 53 of the cover 5.

Figure 7:
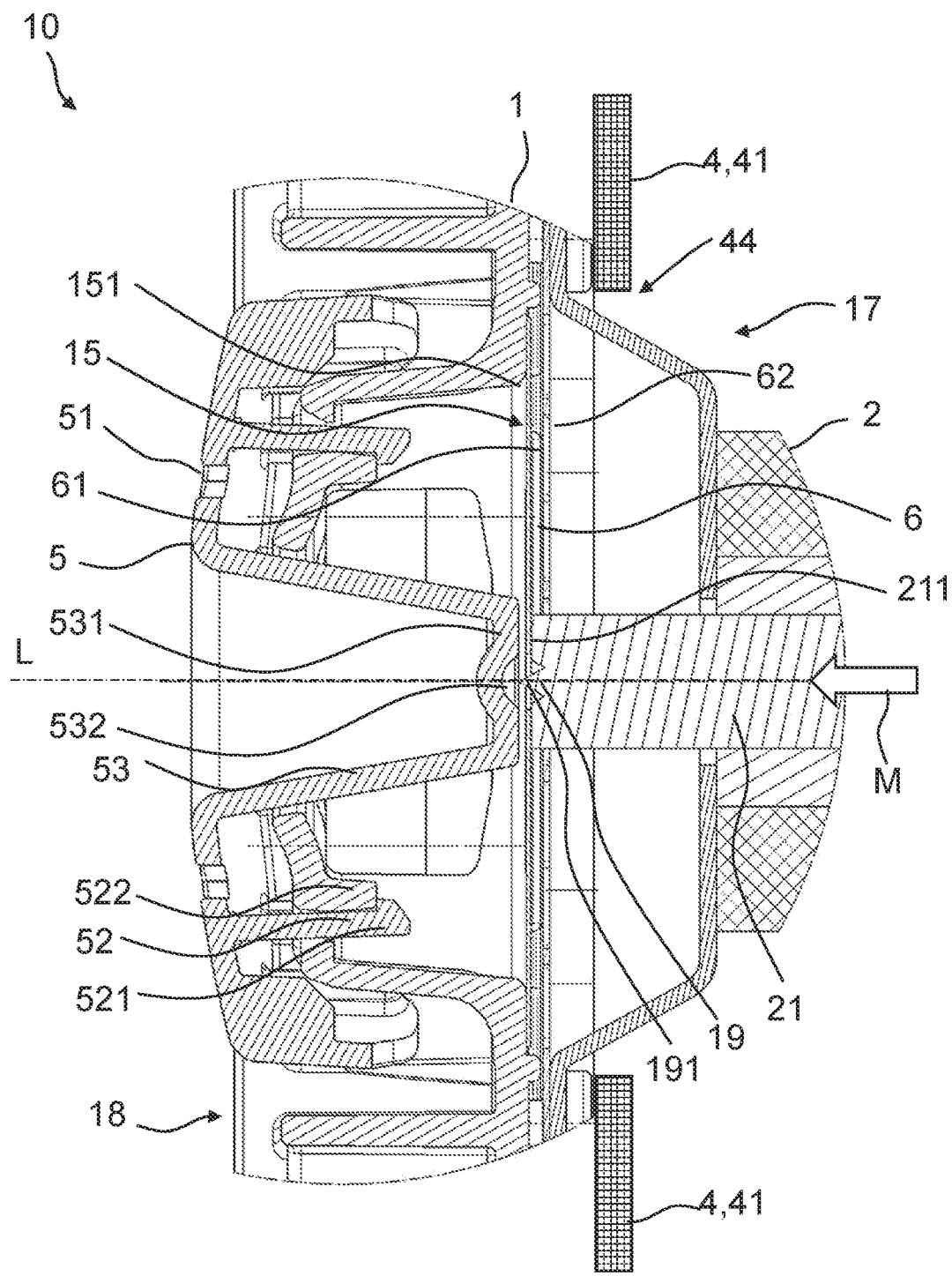
FIG. 7 shows a longitudinal section of the venting unit according to FIG. 5 with activated actor and punctured membrane.
Figure 8:
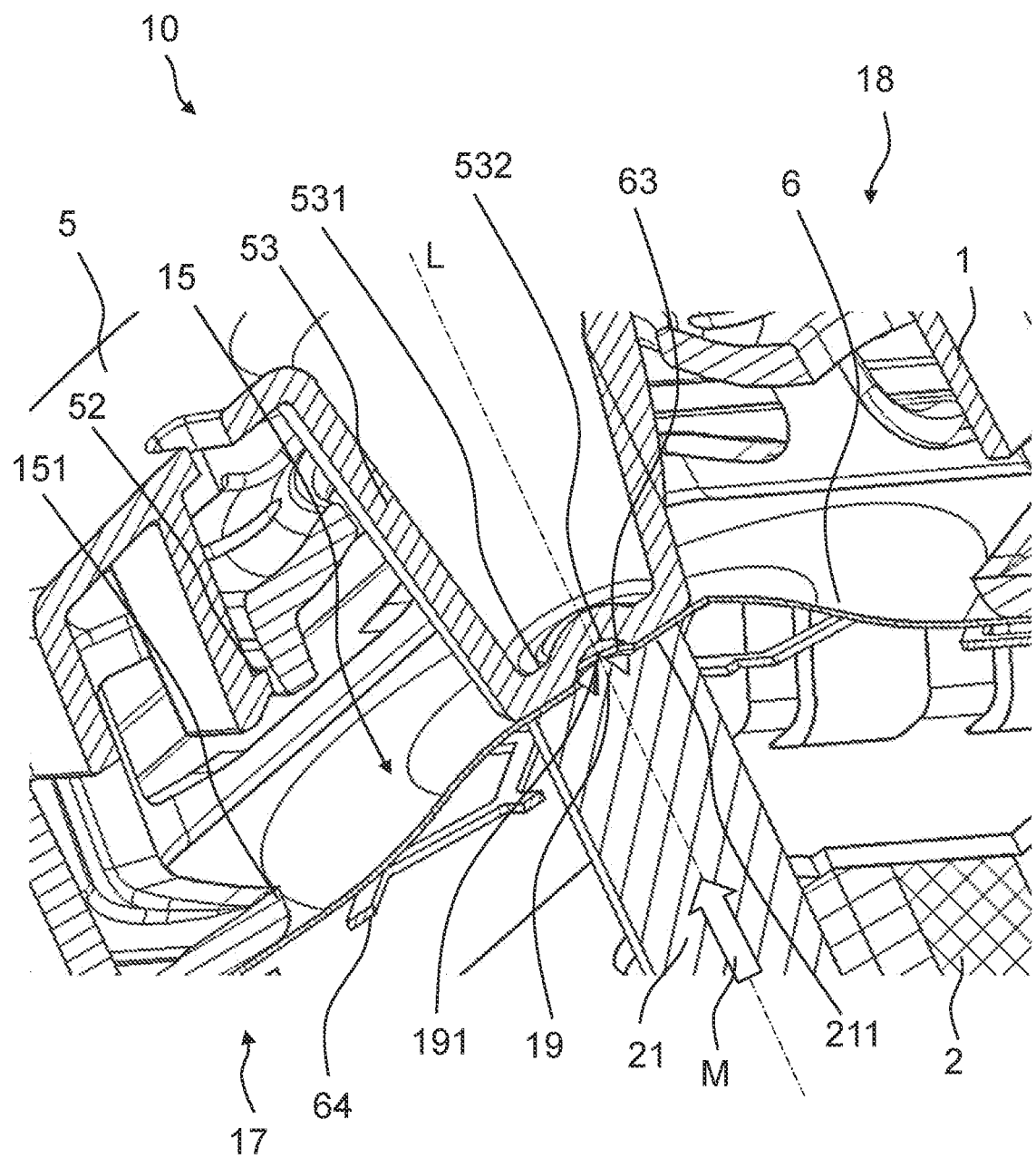
FIG. 8 shows an isometric section view of the venting unit according to FIG. 5 with punctured membrane, wherein the actor contacts the actuation sleeve of the cover.

FIG. 7 shows in this context a longitudinal section through the venting unit 10 with punctured membrane 6. FIG. 8 shows an isometric section view of the venting unit 10 with punctured membrane 6 wherein the actor is resting against the actuation sleeve 53 of the cover 5. Membrane 6 is curved upwardly by the movement of the actuation element 21 and is clamped between actuation element 21 and bottom 531 of the actuation sleeve 53. In the area of the receiving region 532, the membrane 6 comprises a puncture opening 63 which is created by the perforation of the membrane 6 by the tip 191 of the emergency venting spike 19. The puncture opening 63 can lead to bursting of the membrane 6 as a result of increasing pressure.

Upon further movement of the actuation element 21 of the actor 2, the actuation sleeve 53 is pushed farther in axial direction L until, after puncturing the membrane 6 with the emergency venting spike 19, the fastening mechanism of the cover 5 embodied as a locking mechanism 52 is released. The cover 5 can thus fold away or can even be lifted off completely.

Figure 9:
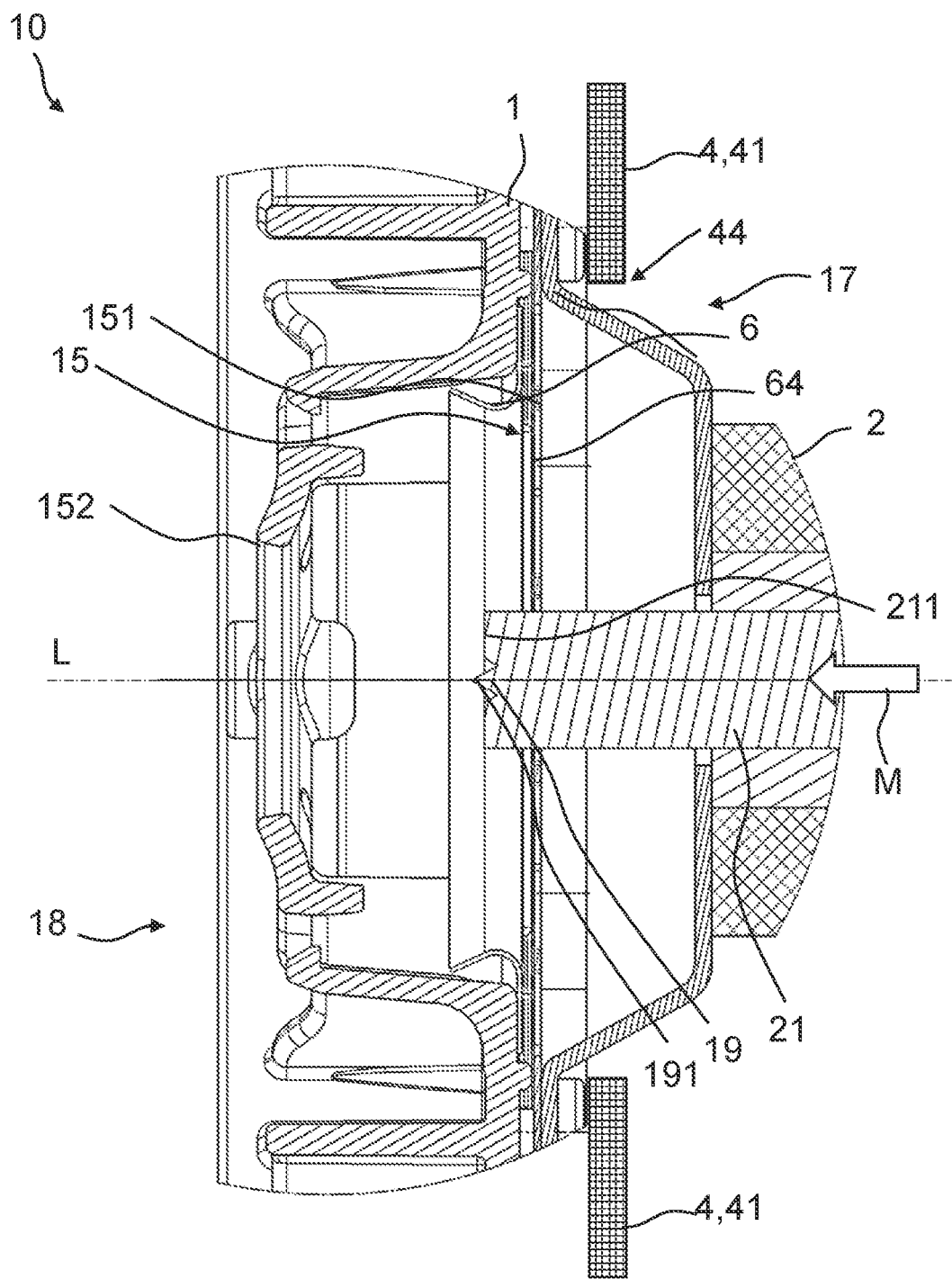
FIG. 9 shows a longitudinal section of the venting unit according to FIG. 5 with removed cover.
Figure 10:
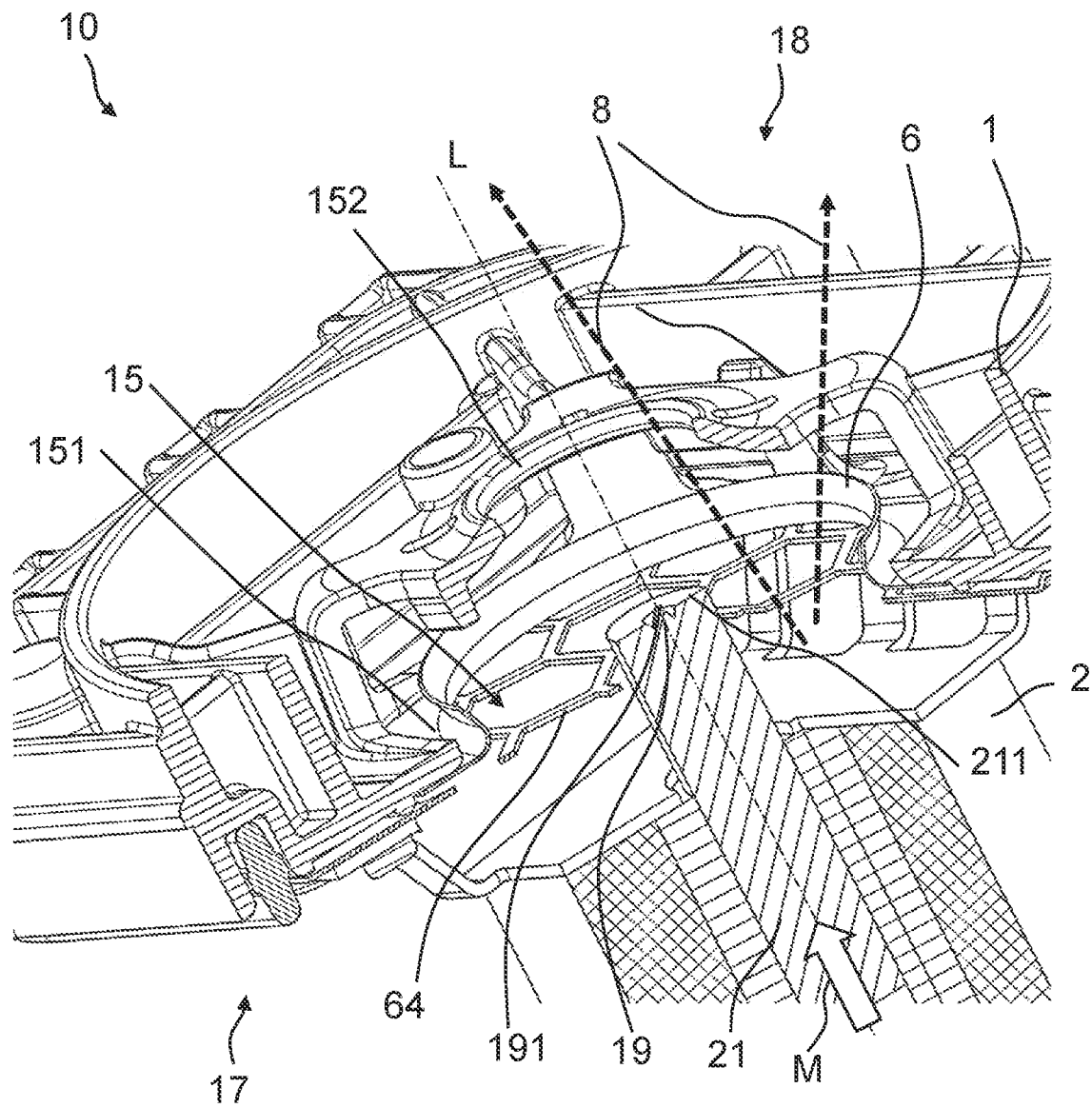
FIG. 10 shows an isometric section view of the venting unit according to FIG. 5 with removed cover.

FIG. 9 shows in this respect a longitudinal section of the venting unit 10 with burst-open membrane 6 and removed cover while in FIG. 10 an isometric section view of the venting unit 10 in this state is illustrated. The fluid path 8 for the outflowing gas is illustrated with dashed arrows. It can be seen that the gas, with lifted-off cover, can flow freely through the gas passage opening 15 to the outer side 18. The base body 1 comprises for this purpose a central opening 152.

Figure 11:
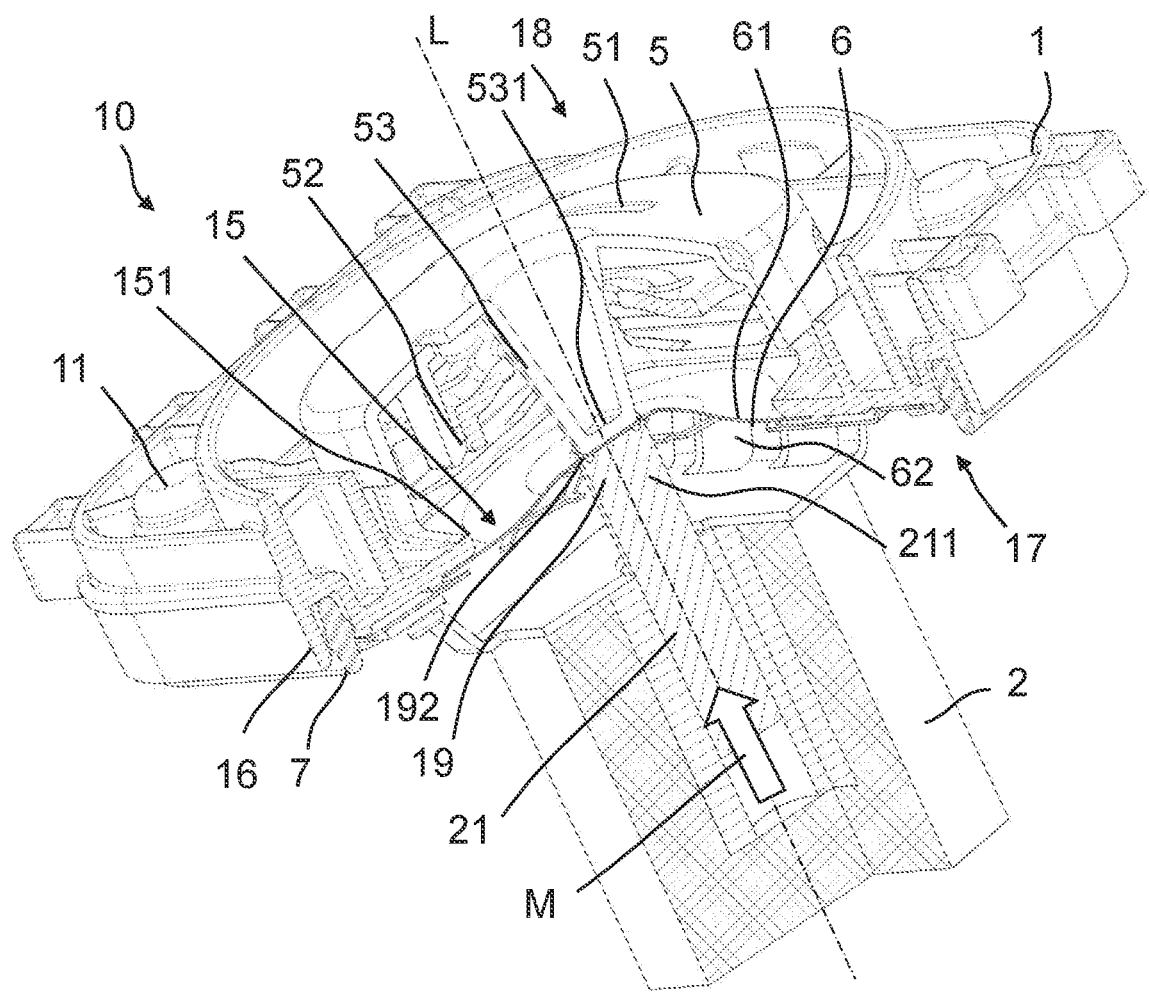
FIG. 11 shows an isometric section view of a venting unit according to a further embodiment of the invention with a cutting edge instead of a tip.
Figure 12:
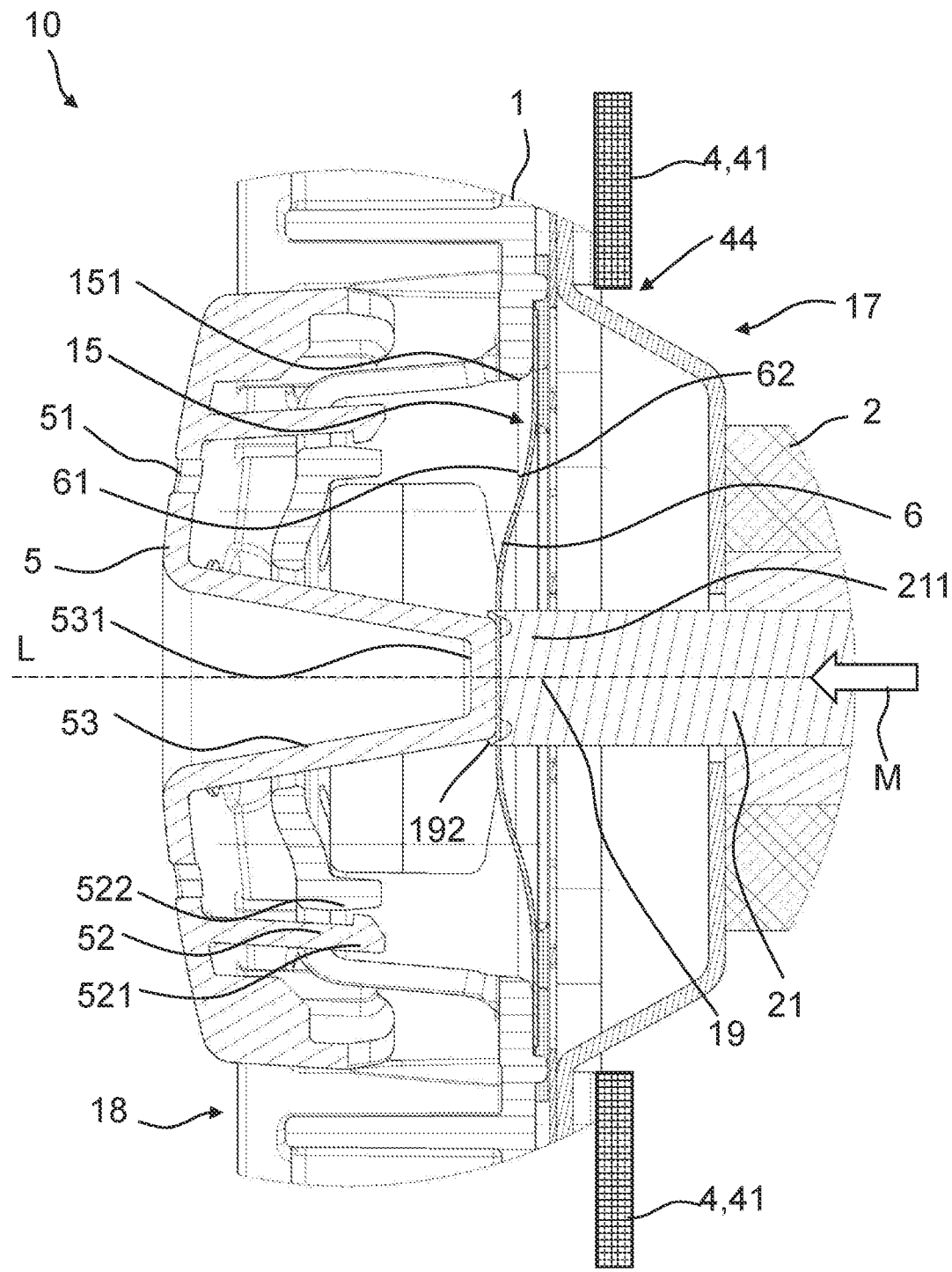
FIG. 12 shows a longitudinal section of the venting unit according to FIG. 11 with activated actor and cut-through membrane.

FIG. 11 shows an isometric section view of a venting unit 10 according to a further embodiment of the invention with at least one cutting edge 192 instead of a tip 191. FIG. 12 shows for this purpose a longitudinal section through the venting unit 10 according to FIG. 11 with activated actor 2 and cut-through membrane 6.

The venting unit 10 comprises a base body 1 which can be connected fluid-tightly to a rim of a housing opening 44 of the housing 4, with an outer side 18 and an inner side 17. The base body 1 comprises at least one gas passage opening 15 which is closed by a membrane 6 that spans across areally transversely to an axial direction L. The base body 1 is operatively connected to an actor 2 which comprises an emergency venting spike 19 that extends in axial direction L toward the membrane 6. Its cutting edge 192 is arranged at the end face at a cylindrical actuation element 21 and in a state of rest is arranged spaced apart at a predetermined distance from the membrane surface 62. As in the embodiment illustrated in FIGS. 1 and 2, the actor 2 can be arranged at the base body 1 and can be connected to the latter.

The actuation element 21 comprises the preferably circumferentially extending cutting edge 192 at the surface of the emergency venting spike 19 facing the membrane 6 which has a diameter that is slightly larger than the diameter of the bottom 531 of the actuation sleeve 53. In this way, the cutting edge 192 grips around the bottom 531 of the actuation sleeve 53 at its outer rim. Upon actuation of the actor 2, the membrane 6 is bulged upwardly by the movement of the actuation element 21, clamped between actuation element 21 and bottom 531 of the actuation sleeve 53, and cut through upon moving actuation element 21 and bottom 531 of the actuation sleeve 53 toward each other. In this way, an opening in the membrane 6 for the emergency venting action of the housing 4 is freed.

In relation to other features of the venting unit 10 illustrated in FIGS. 11 and 12, reference is being had to the description of the embodiment illustrated in FIGS. 5 through 10.

REFERENCE CHARACTERS

10 venting unit
1 base body
11 fastener engagement region
13 actuation sleeve of the base body
15 gas passage opening
151 rim of gas passage opening
152 central opening
16 seal receiving groove of the base body
17 inner side of the base body
18 outer side of the base body
19 emergency venting spike
191 tip of the emergency venting spike
192 cutting edge of the emergency venting spike
2 actor
21 actuation element
211 actuation surface
4 housing
41 housing wall
44 housing opening
5 cover
51 bidirectional venting openings
52 locking mechanism
521 locking element
522 counter locking element
53 actuation sleeve of the cover
531 bottom
532 receiving region
54 rim
6 membrane
61 outer membrane surface
62 inner membrane surface
63 puncture opening
64 membrane protection grid
7 housing seal
8 fluid path
L axial direction
M movement direction actor

What is claimed is:

1. A venting unit for a housing, the venting unit comprising:
a base body configured to be connected fluid-tightly to a rim of a housing opening of the housing, wherein the base body comprises an outer side and an inner side, and wherein the base body comprises a gas passage opening and a membrane closing the gas passage opening and spanned areally across the gas passage opening transversely to an axial direction of the base body;
an actor operatively connected to the base body and comprising an emergency venting spike extending in the axial direction toward the membrane, wherein the emergency venting spike comprises a tip or a cutting edge, wherein the tip or the cutting edge, in a state of rest of the actor, is arranged spaced apart at a predetermined distance from a membrane surface of the membrane, wherein the emergency venting spike is configured to move toward the membrane when the actor is actuated into an actuated state so that the tip or the cutting edge punctures or cuts through the membrane, and wherein the actor is arranged at the base body or is configured to be arranged at the housing;
a cover arranged at the outer side of the base body and covering the gas passage opening;
a fastening mechanism connecting the cover to the base body;
wherein the actor comprises an actuation element configured to release the fastening mechanism.

2. The venting unit according to claim 1, wherein the actor is arranged at the inner side of the base body.

3. The venting unit according to claim 1, wherein the actor is configured to be arranged at an outer side of the housing or at an inner side of the housing.

4. The venting unit according to claim 1, wherein the cover comprises an actuation sleeve configured to interact with the actuation element of the actor for release of the fastening mechanism of the cover, wherein the actuation element of the actor, in the state of rest of the actor, is arranged spaced apart at a predetermined distance from a bottom of the actuation sleeve.

5. The venting unit according to claim 4, wherein the actuation element of the actor comprises an actuation surface facing the membrane, wherein the emergency venting spike is arranged at the actuation surface of the actuation element of the actor.

6. The venting unit according to claim 5, wherein the bottom of the actuation sleeve comprises a receiving region configured to receive the emergency venting spike, wherein the actuation surface of the actuation element of the actor in the actuated state is resting flat against the bottom of the actuation sleeve, and wherein the tip or the at least one cutting edge of the emergency venting spike is received by the receiving region.

7. The venting unit according to claim 1, wherein the actor is an electrically actuatable actor.

8. The venting unit according to claim 7, wherein the electrically actuatable actor is an electromagnetic actor.

9. The venting unit according to claim 1, wherein the actor is configured to directly actuate of the actuation element.

10. The venting unit according to claim 1, wherein the actor is configured to indirectly actuate the actuation element.

11. The venting unit according to claim 10, wherein the actor is configured to release a pretensioning mechanism acting on the actuation element.

12. The venting unit according to claim 1, wherein the actor comprises at least one signal input configured to receive a control signal of a battery and/or a control signal of a vehicle.

13. The venting unit according to claim 1, wherein the membrane is arranged at the inner side of the base body.

14. The venting unit according to claim 1, wherein the membrane is a gas-impermeable membrane.

15. The venting unit according to claim 1, wherein the gas-impermeable membrane is a polymer film.

16. The venting unit according to claim 1, wherein the membrane is a semipermeable membrane enabling passage of gaseous media from an environment into the housing and in reverse and preventing passage of liquid media and/or solids.

17. The venting unit according to claim 1, wherein the base body comprises at least one fastener engagement region configured to attach the venting unit to the housing.

18. The venting unit according to claim 1, further comprising a housing seal circumferentially surrounding the gas passage opening of the base body at the inner side of the base body.

19. A housing for receiving battery cells, the housing comprising at least one housing wall comprising a housing opening and further comprising a venting unit according to claim 1, wherein the venting unit closes the housing opening.

20. A method for venting a housing with a venting unit according to claim 1, the method comprising:
actuating the actor by a control signal of a battery and/or a control signal of a vehicle, puncturing with the emergency venting spike the membrane, and discharging a gas from the housing through the gas passage opening.

21. The method according to claim 20, further comprising, after puncturing the membrane with the emergency venting spike, releasing with the actuation element of the actor the fastening mechanism connecting the cover to the base body.

* * * * *